(12) United States Patent
Culler (10) Patent No.: US 7,054,172 B2
(45) Date of Patent: May 30, 2006

(54) METHOD AND STRUCTURE FOR ACTIVE POWER SUPPLY CONTROL AND STABILIZATION

(75) Inventor: Jason Harold Culler, Livermore, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 10/448,764

(22) Filed: May 30, 2003

(65) Prior Publication Data

US 2004/0239302 A1    Dec. 2, 2004

(51) Int. Cl.
 *H02M 1/12* (2006.01)
(52) U.S. Cl. .................... 363/39; 327/554; 307/105
(58) Field of Classification Search ............ 363/39; 327/554; 333/262, 263; 307/105
See application file for complete search history.

(56) References Cited

U.S. PATENT DOCUMENTS

| | | | |
|---|---|---|---|
| 5,296,764 A | | 3/1994 | Asplund et al. |
| 5,513,090 A | | 4/1996 | Bhattacharya et al. |
| 5,548,165 A | * | 8/1996 | Mohan et al. ............ 307/36 |
| 6,362,691 B1 | * | 3/2002 | Forbes .................... 330/303 |
| 6,469,485 B1 | * | 10/2002 | Cheng et al. ........... 323/286 |

FOREIGN PATENT DOCUMENTS

JP    10032931 A    2/1998

* cited by examiner

*Primary Examiner*—Gary L Laxton (57) ABSTRACT

A method and structure for active power control of a power supply element coupled to an electronic circuit. The structure comprises a control element coupled to the electronic circuit, said control element comprising one or more of a phase detector, a counter, a level detector, a voltage controlled oscillator, and one or more transistive elements wherein the control element is operable to measure one or more oscillations of a power supply signal of the power supply element. The structure further comprises a stabilization element coupled to the control element and coupled to the circuit, comprising one or more capacitive elements, one or more transistive elements and one or more resistive elements, wherein said one or more capacitive elements, one or more transistive elements and one or more resistive elements are operable to mitigate one or more oscillations of the power supply signal of the power supply element. The determination of which capacitive elements and resistive elements to switch may be made by measuring the oscillations of the power supply signal, and reducing power supply oscillations by performing one or more of reducing amplitudes of corresponding resonance frequencies of the power supply signal, changing one or more characteristic frequencies of the circuit and injecting a feedback signal into a power supply of the circuit.

24 Claims, 11 Drawing Sheets

METHOD AND STRUCTURE FOR ACTIVE POWER SUPPLY CONTROL AND STABILIZATION

TECHNICAL FIELD

This invention relates generally to the field of electronic circuit devices, and more specifically to the control of the power supply of an electronic circuit.

BACKGROUND

Electronic circuits can be impaired by noise from both internal and external sources. An important source of signal degradation is high frequency noise due to power supply oscillations. These power supply oscillations, which are a source of circuit noise that impair the overall performance of a circuit, can be reduced by the use of a bank of fixed bypass capacitors. These fixed bypass capacitors are -designed to reduce known power supply oscillations, thereby improving circuit performance. However, power supply oscillations are not stationary and the frequency spectrum of the oscillations tends to change over time. The fixed bypass capacitors do not effectively mitigate the time-varying power supply oscillations. Additionally, the fixed bypass capacitors have a resonance frequency that can be within the range of oscillations of the power supply.

SUMMARY

Active power control of a power supply element coupled to an electronic circuit is disclosed. According to a structure, the active power control comprises a control element coupled to the electronic circuit, said control element comprising one or more of a phase detector, a counter, a level detector, a voltage controlled oscillator, and one or more transistive elements. The control element is operable to measure one or more oscillations of a power supply signal of the power supply element. The structure further comprises a stabilization element coupled to the control element and coupled to the circuit, comprising one or more capacitive elements, one or more transistive elements and one or more resistive elements, wherein said one or more capacitive elements, one or more transistive elements and one or more resistive elements are operable to mitigate one or more oscillations of the power supply signal of the power supply element. According to a method for active power control, the determination of which capacitive elements, transistive elements and resistive elements to switch may be made by measuring the oscillations of the power supply signal, and reducing power supply oscillations by performing one or more of reducing amplitudes of corresponding resonance frequencies of the power supply signal, changing one or more characteristic frequencies of the circuit and injecting a feedback signal into a power supply of the circuit.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
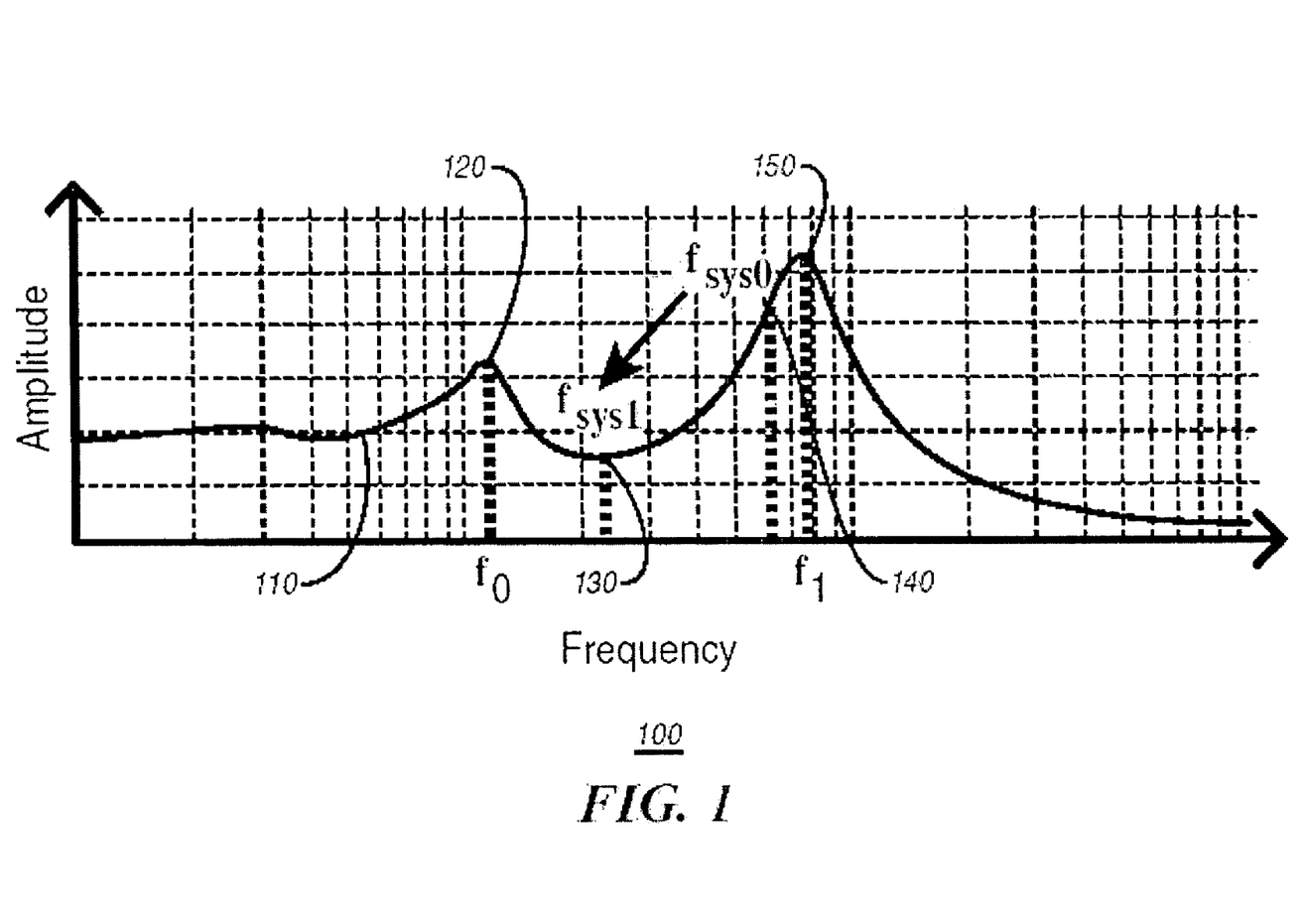
FIG. 1 is a plot of shifting the system clock to reduce the impact of power supply oscillations, according to certain embodiments of the present invention.

Referring now to FIG. 1, a plot 100 of power supply oscillations is shown according to a certain embodiment of the present invention. Amplitude versus frequency curve 110 of plot 100 has resonance peak 120 and resonance peak 150. A first operating point 140 is close to resonance peak 150 while a better location would be second operating point 130. The use of fixed bypass capacitors effectively fixes first operating point 140, while second operating point 130 would be more effective in limiting an impact of power supply oscillations of a power supply coupled to a system that is powered by the power supply. An active power control circuit that is operable to shift a system frequency would improve the performance of the system coupled to the active power control circuit. In certain embodiments of the present invention, shifting a system frequency to improve system performance is an option of the active power control circuit.

Figure 2:
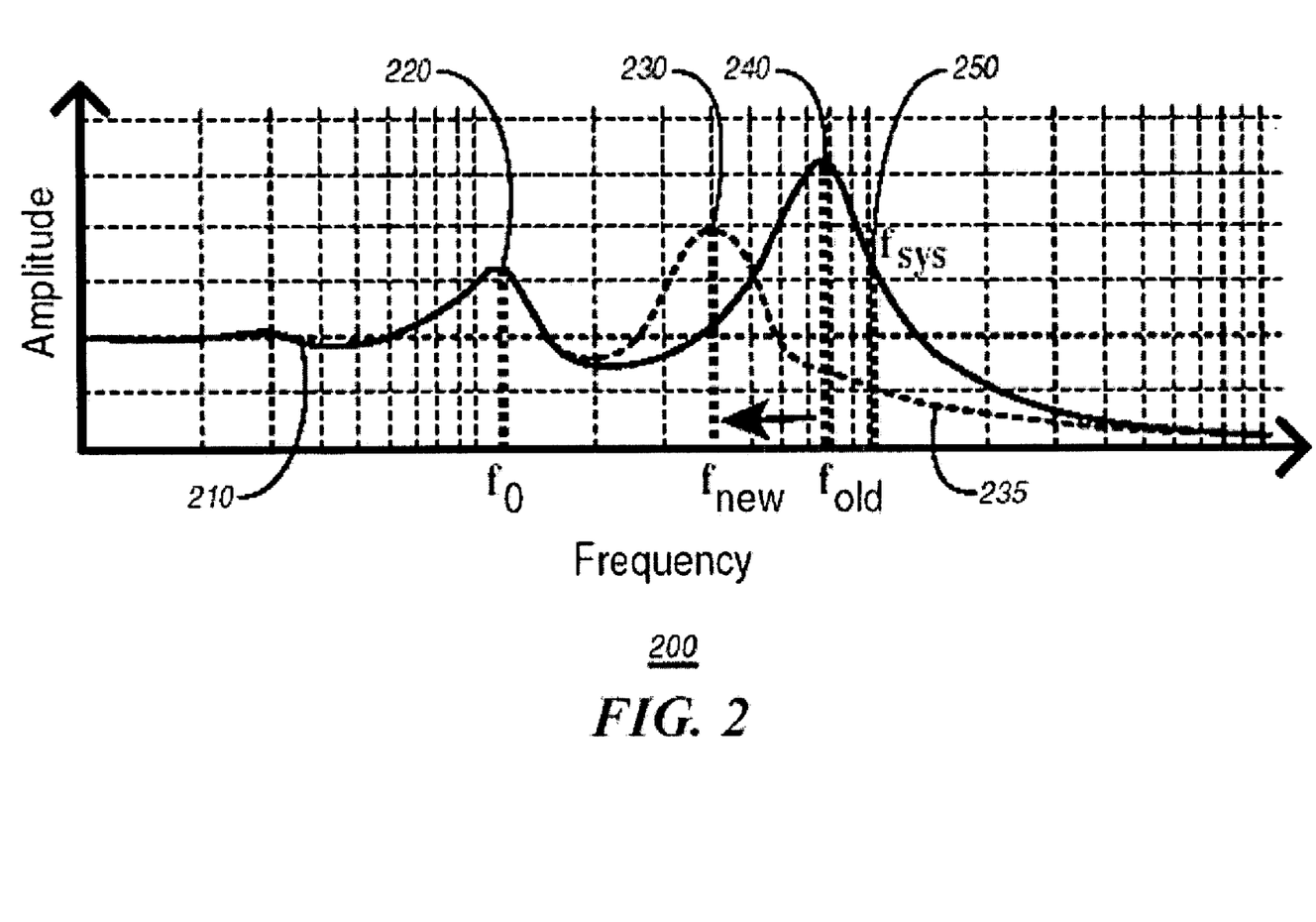
FIG. 2 is a plot of shifting a power supply resonance curve to reduce the impact of power supply oscillations, according to certain embodiments of the present invention.

Referring now to FIG. 2, a plot 200 of shifting a power supply resonance curve to reduce an impact of power supply oscillations is shown, according to a certain embodiment of the present invention. Power supply oscillations 210 contain a third resonance point 220 and a fourth resonance point 240. Fourth resonance point 240 is located close enough to system operating point 250 so that system performance is substantially impacted. The use of an active power control circuit shifts fourth resonance point 240 to a reduced amplitude point 230 that is a greater distance from system operating point 250, wherein the distance is measured in units of frequency. In an embodiment of the present invention, reducing power supply oscillation amplitudes and shifting a location of a power supply local maxima to improve system performance is an option of the active power control circuit.

Figure 3:
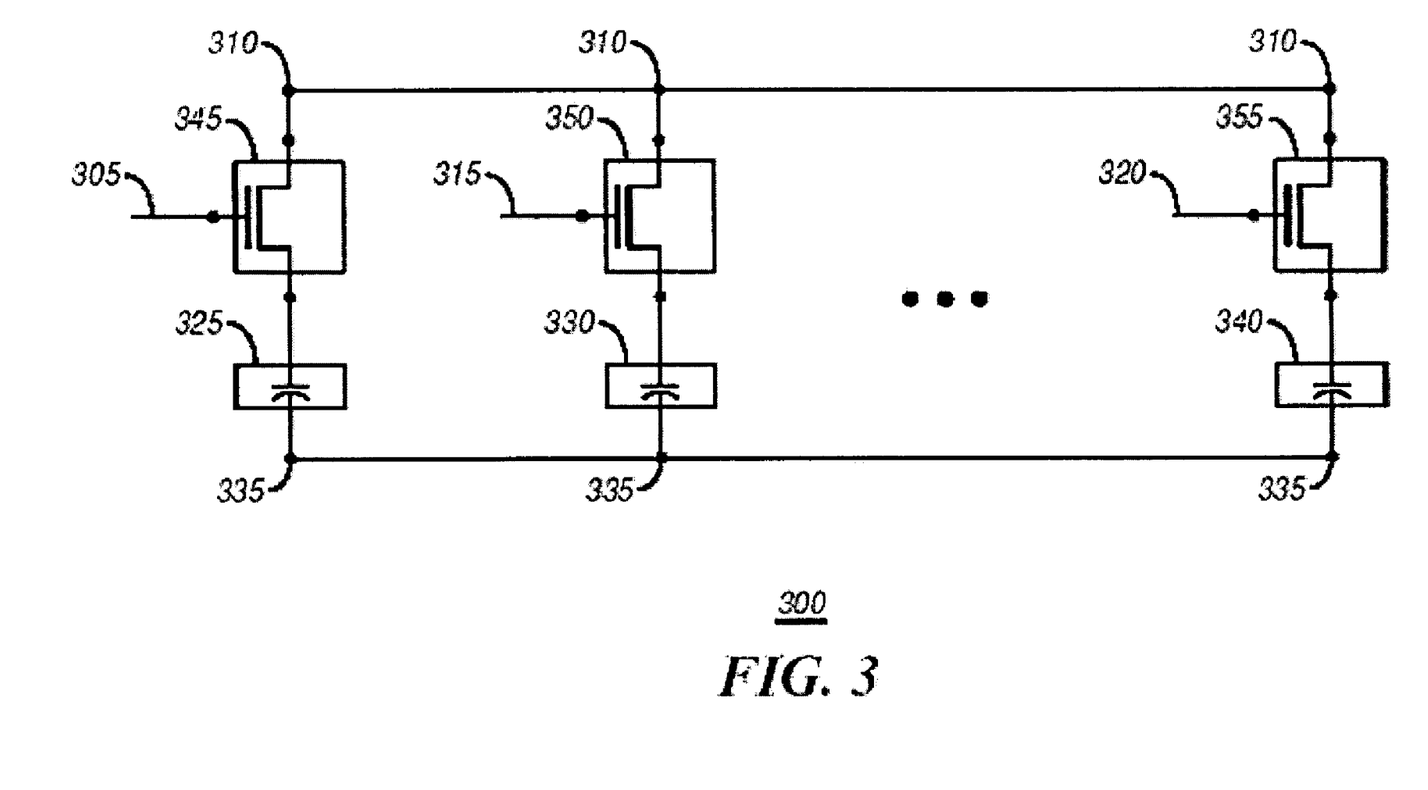
FIG. 3 is a first circuit for enabling active power supply control, according to certain embodiments of the present invention.

Referring now to FIG. 3 a first circuit 300 operable to allow active power supply control circuit is shown, according to a certain embodiment of the present invention. First circuit 300 comprises one or more switching elements (345, 350, 355) coupled to a corresponding one or more capacitive elements (325, 330, 340) wherein a first terminal of switching elements (345, 350, 355) is coupled to a first terminal of capacitive elements (325, 330, 340). A second terminal of capacitive elements (325, 330, 340) is coupled to ground 335. A second terminal of switching elements (345, 350, 355) is coupled to a power supply signal 310, while a third terminal of switching elements (345, 350, 355) is coupled to corresponding switching element inputs (305, 315, 320). Power supply signal 310 may comprise one or more oscillations with a corresponding one or more frequencies. The one or more oscillations are operable to degrade a signal quality of power supply signal 310. Additionally, the one or more frequencies may exceed a filtering capability of an electronic circuit coupled to power supply signal 310. In this case, appropriately switching one or more of capacitive elements (325, 330, 340) into power supply signal 310 may be used to reduce an effect of the one or more oscillations. In an embodiment of the present invention, a low value of a switching element input is operable to switch out the corresponding switching element, thereby reducing an effective capacitance of the supply signal. For example, switching off switching element 345 is operable to reduce a capacitance of power supply signal 310 by an amount substantially equivalent to a capacitance of capacitive element 325. In an embodiment of the present invention, switching elements (345, 350, 355) are FET transistors and capacitive elements (325, 330, 340) are capacitors. It is noted that one of skill in the art will recognize that other types of switching elements and capacitive elements could be used without departing from the spirit and scope of the present invention. It is further noted that power supply signal 310 could be directly coupled to a power supply, or could be a signal that has passed through one or more circuit elements after said power supply, provided a one or more distortions due to power supply oscillations are substantially present in the power supply signal 310.

Figure 4:
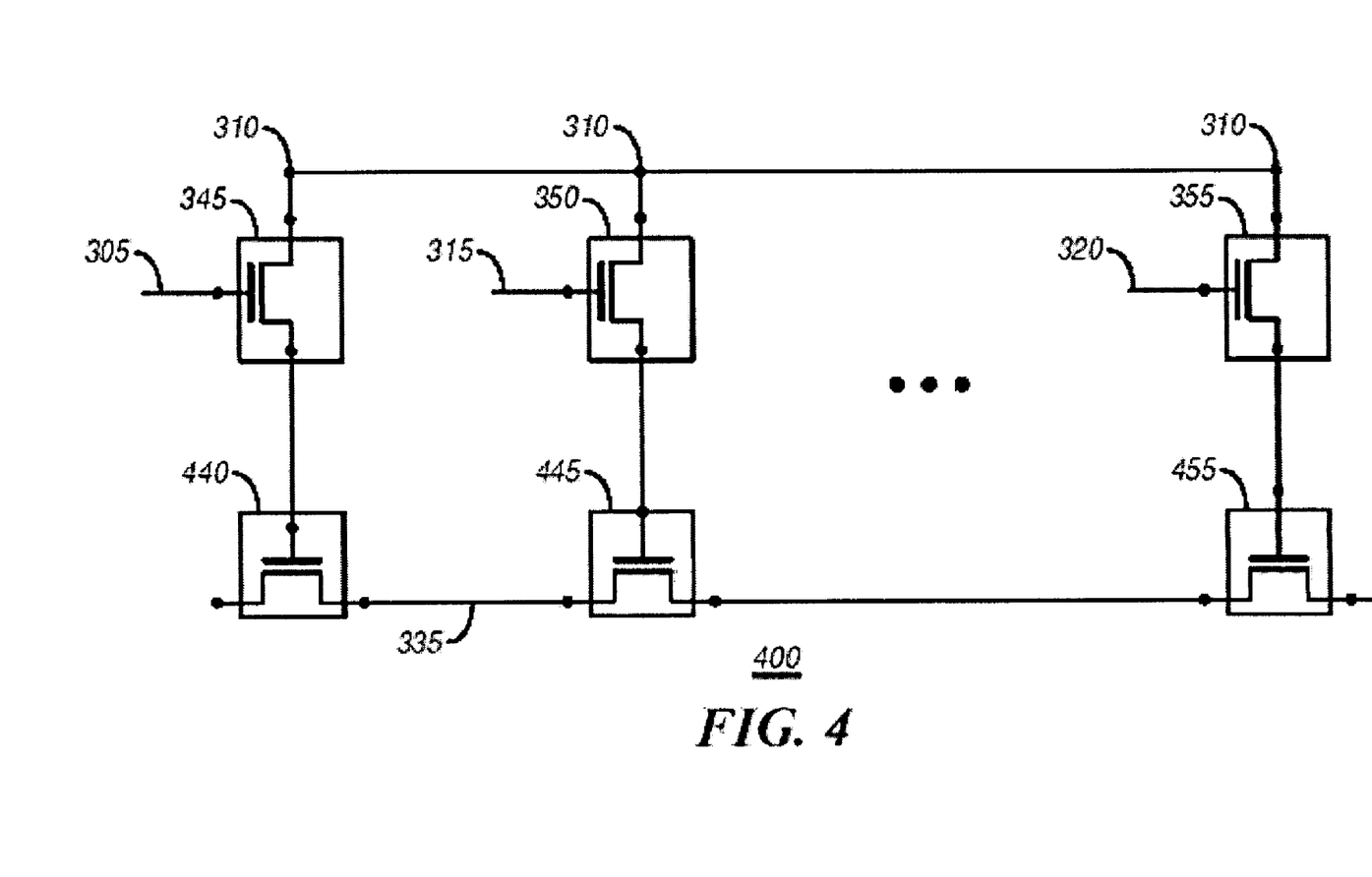
FIG. 4 is a second circuit for enabling active power supply control, according to certain embodiments of the present invention.

Referring now to FIG. 4 a second circuit 400 operable to enable active power supply control circuit is shown, according to a certain embodiment of the present invention. Second circuit 400 comprises one or more switching elements (345, 350, 355) coupled to a corresponding one or more transistive elements (440, 445, 455) wherein a first terminal of switching elements (345, 350, 355) is coupled to a first terminal of transistive elements (440, 445, 455). It is noted that the capacitive elements (325, 330, 340) are operable to be precharged. A second terminal and a third terminal of transistive elements (440, 445, 455) are coupled to ground 335. A second terminal of switching elements (345, 350, 355) is coupled to a power supply signal 310, while a third terminal of switching elements (345, 350, 355) is coupled to corresponding switching element inputs (305, 315, 320). In an embodiment of the present invention, a low value of a switching element input is operable to switch out the corresponding switching element, thereby reducing an effective capacitance of the power supply signal 310. For example, switching off switching element 345 is operable to reduce a capacitance of power supply signal 310 by and amount substantially equivalent to a capacitance of transistive element 440. In an embodiment of the present invention, switching elements (345, 350, 355) are FET transistors and transistive elements (440,445,455) are transistors wherein the first terminal of transistive elements (440,445, 455) are gates. Therefore, in the second circuit 400, transistive elements (440, 445, 455) act as capacitive elements when coupled to supply signal 310. It is noted that power supply signal 310 could be directly coupled to a power supply, or could be a signal that has passed through one or more circuit elements after said power supply provided one or more distortions due to power supply oscillations are substantially present in the power supply signal 310.

Figure 5:
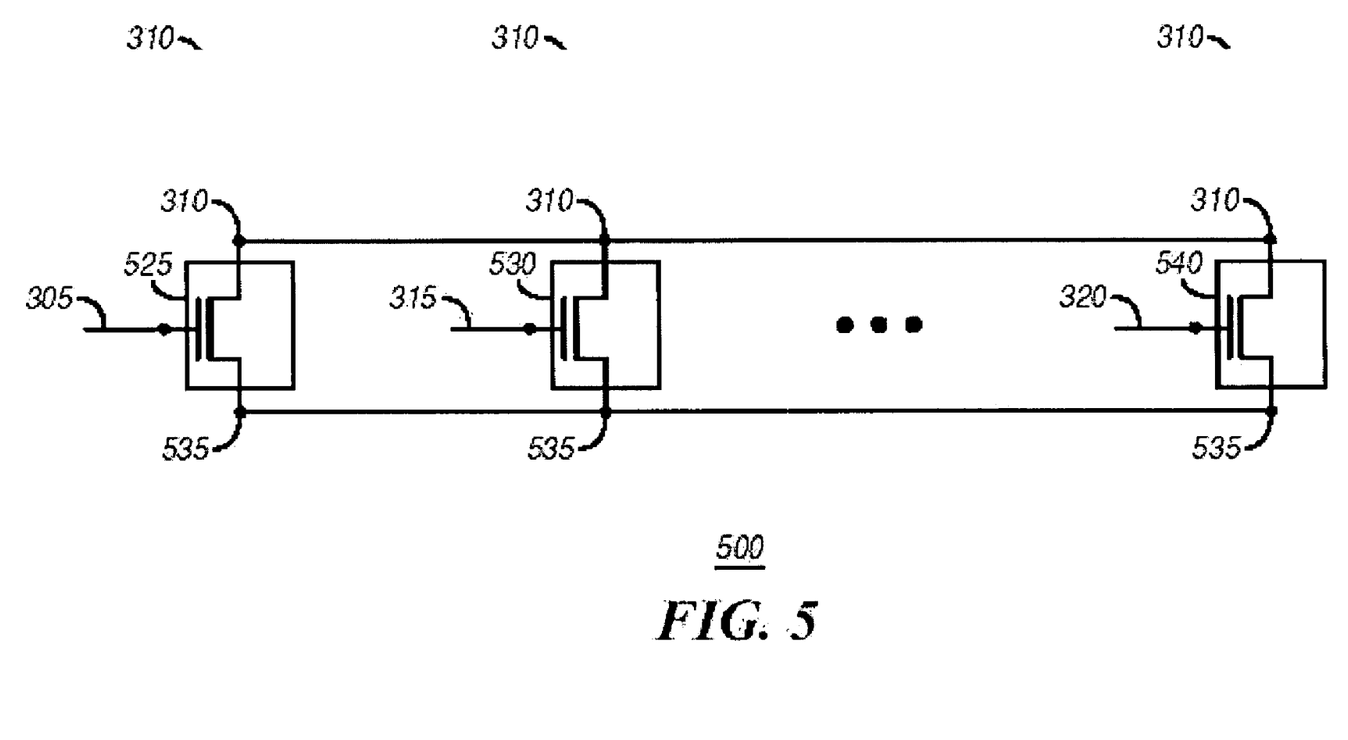
FIG. 5 is a third circuit for enabling active power supply control, according to certain embodiments of the present invention.

Referring now to FIG. 5, a third circuit 500 operable to enable active power supply control is shown, according to a certain embodiment of the present invention. Third circuit 500 comprises a one or more switching elements (525, 530, 540). A first terminal of switching elements (525, 530, 540) is coupled to a power supply signal 310. A second terminal of switching elements (525, 530, 540) is coupled to switching element inputs (305, 315, 320). A third terminal of switching elements (525, 530, 540) is coupled to ground 335. In an embodiment of the present invention, a high value of a switching element input is operable to switch on the corresponding switching element, enabling a signal with an opposite phase with respect to power supply signal 310 to be coupled to power supply signal 310. Switching on one or more of the one or more switching elements (525, 530, 540) is operable to make power supply signal 310 substantially flat with respect to frequency. It is noted that the FETs could be coupled so that one or more of the FETs pull the signal down while one or more of the FETs pull the signal up. In the embodiment of FIG. 5, switching elements (525, 530, 540) act as a provider of an amount of signal of opposite phase with respect to power supply signal 310. The switching elements (525, 530, 540) are operable to act as a load with a phase opposite to that of power supply signal 310. If power supply signal 310 has a resonance frequency or periodic load, switching elements (525, 530, 540) are operable to be controlled to represent a constant load to the power supply. In an embodiment of the present invention, switching elements (525, 530, 540) are FETs.

Figure 6:
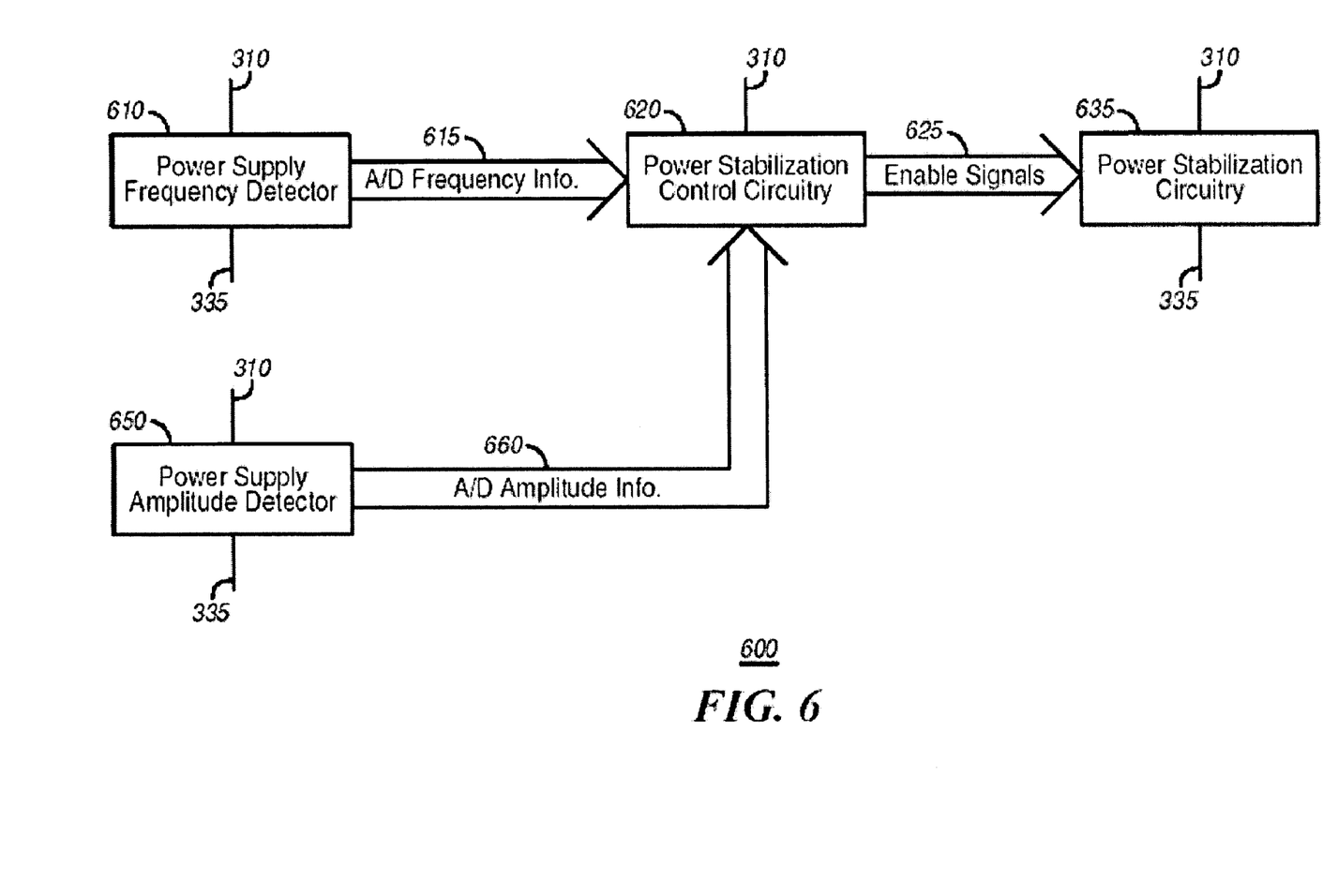
FIG. 6 is a system for active power supply control, according to certain embodiments of the present invention.

The circuits of FIG. 3, FIG. 4, and FIG. 5 are operable to change an amount and a location of one or more peaks of power supply signal 310. This change may be effected by switching in or out one or more switching elements of the corresponding first circuit 300, second circuit 400, or third circuit 500. A selection of which switching elements to turn off or on is determined by a control circuit coupled to the first circuit 300, second circuit 400, or third circuit 500. Referring now to FIG. 6 a system 600 for active power supply control is shown, according to a certain embodiment of the present invention. The system comprises a frequency detector 610 operable to detect a one or more frequencies of power supply signal 310, and an amplitude detector 650 operable to detect a one or more amplitudes of power supply signal 310. It is noted that in certain embodiments of the present invention, frequency detector 610 may detect the one or more frequencies of power supply signal 310 by computing a spectrum of power supply signal 310. In an embodiment of the present invention, the one or more frequencies correspond to the one or more amplitudes. It is further noted that one of skill in the art will recognize that the one or more amplitudes and the one or more phases could be continuous with respect to a time reference.

The frequency detector 610 and amplitude detector 650 are coupled to power stabilization control circuitry 620. Frequency detector 610 passes the one or more frequencies to the power stabilization control circuitry 620 in analog or digital format 615. Amplitude detector 650 passes the one or more amplitudes to the power stabilization control circuitry 620 in analog or digital format 660. Power stabilization control circuitry 620 determines a value of the switching element inputs (305, 315, 320). Switching element inputs are passed 625 to power stabilization circuitry 635 to mitigate one or more oscillations of power supply signal 310. The power supply signal 310 is operable to be generated by a power supply element coupled to frequency detector 610 and amplitude detector 650. Frequency detector 610, amplitude detector 650, and power stabilization control circuitry 620 may be collectively referred to as a control element usable to generate control signals that enable the mitigation of power supply oscillations. The power supply element comprises one or more of phase detectors, counters, level detectors, voltage controlled oscillators, one or more transistive elements, and one or more resistive elements. Power stabilization circuitry 635 comprises one or more of the first circuit 300, second circuit 400, and third circuit 500. One of skill in the art will recognize that any of first circuit 300, second circuit 400, or third circuit 500 is operable to enable a mitigation of one or more oscillations of power supply signal. It is noted that power stabilization circuitry 635 comprises one or more transistive elements, one or more resistive elements, one or more capacitive elements, and one or more switching elements.

The power stabilization control circuitry 620 operates on the one or more amplitudes and one or more frequencies to determine an appropriate strategy for mitigating the one or more oscillations of power supply signal 310. As noted in FIG. 1 and FIG. 2, this strategy includes one or more of changing an operating frequency of the circuit, switching in or more one or more of the one or more capacitive elements (325, 330, 340) to change one or more resonance frequencies of power supply signal 310, switching in one or more of the one or more transistive elements (525, 530, 540) thereby coupling a signal to power supply signal 310 with a phase opposite that of power supply signal 310.

Figure 7:
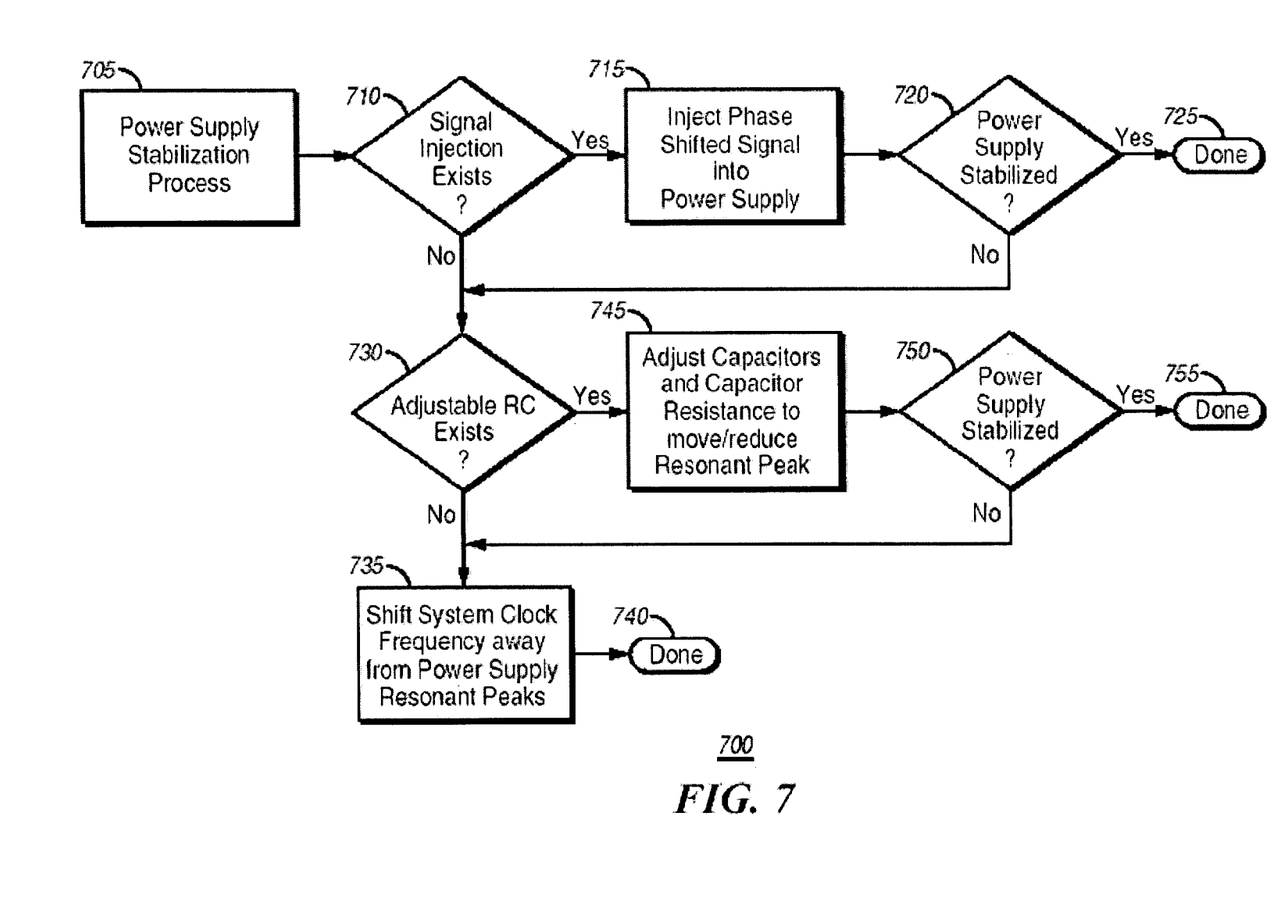
FIG. 7 is a flow diagram of a method for mitigating one or more oscillations of a power supply signal, according to certain embodiments of the present invention.

Referring now to FIG. 7 a flow diagram 700 of a strategy for mitigating one or more oscillations of a power supply signal, according to a certain embodiment of the present invention. A power supply stabilization process is initiated as in block 705. If a power stabilization circuit coupled to the power supply signal comprises a signal injection capability (block 710), then the power stabilization circuit injects a phase shifted signal into the power supply signal so that the one or more oscillations of the power supply signal are substantially reduced (block 715). In a certain embodiment of the present invention, the phase shifted signal has a phase that differs from a phase of the power supply signal by 180 degrees. If the power supply is stabilized (block 720), then the power supply stabilization process is done (block 725). If the power supply is not stabilized (block 720) or the power stabilization circuit does not have a signal injection capability (block 710), then the power stabilization process determines if an adjustable RC component exists (block 730). If the RC component is not present then a system clock is shifted so that the interference due to the one or more oscillations in the power supply signal are reduced (block 735). The power stabilization process then concludes as in block 740. If the RC component is present (block 730), then one or more capacitive elements in the RC component are adjusted so that the one or more power supply oscillations are mitigated (block 745). If the power supply signal is stabilized (block 750), then the power supply stabilization process is complete (block 755). If after adjusting the RC component the power supply signal is not stable, then the system clock is shifted so that the interference due to the one or more oscillations in the power supply signal are reduced (block 735). The power stabilization process then concludes as in block 740.

Figure 8:
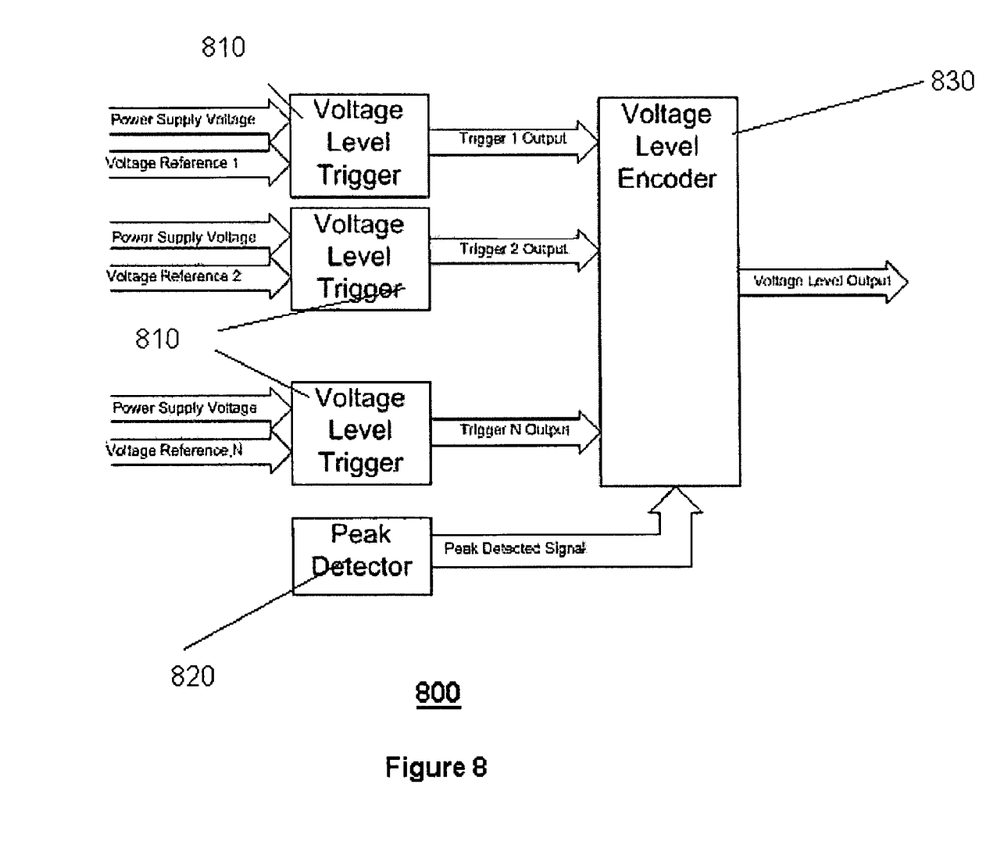
FIGS. 8–11 are block diagrams that illustrate various aspects of the power control circuit of FIG. 6 in accordance with certain embodiments of the present invention.

Referring now to FIGS. 8–11, a more detailed description of the power control circuitry of FIG. 6 is shown. Referring to FIG. 8, an example of acquiring voltage amplitude information in power supply amplitude detector 650 is illustrated in diagram 800. It is noted that there are many peak detectors and voltage sampling circuits suitable for use in the present invention. The sampling circuit could be as simple as a transistor which is turned on by the peak detector passing the voltage to a capacitor for storage—this voltage is then passed to the power stabilization control circuitry 620. FIG. 8 illustrates a parallel arrangement of voltage triggers 810 that feed into an encoder 830. Each voltage trigger of the voltage triggers 810 sends a signal when the power supply equals or exceeds a reference voltage. Each trigger has a different reference voltage, so that at a low voltage maybe one trigger is on, but at higher and higher voltages subsequent triggers are turned on. When the peak detector 820 senses the peak of a power supply oscillation, it signals the encoder 830 to capture the output pattern of the voltage triggers and then encodes the signal digitally. The encoder 830 takes the trigger data and encodes into a code to be used by the power stabilization control circuitry 620.

Figure 9:
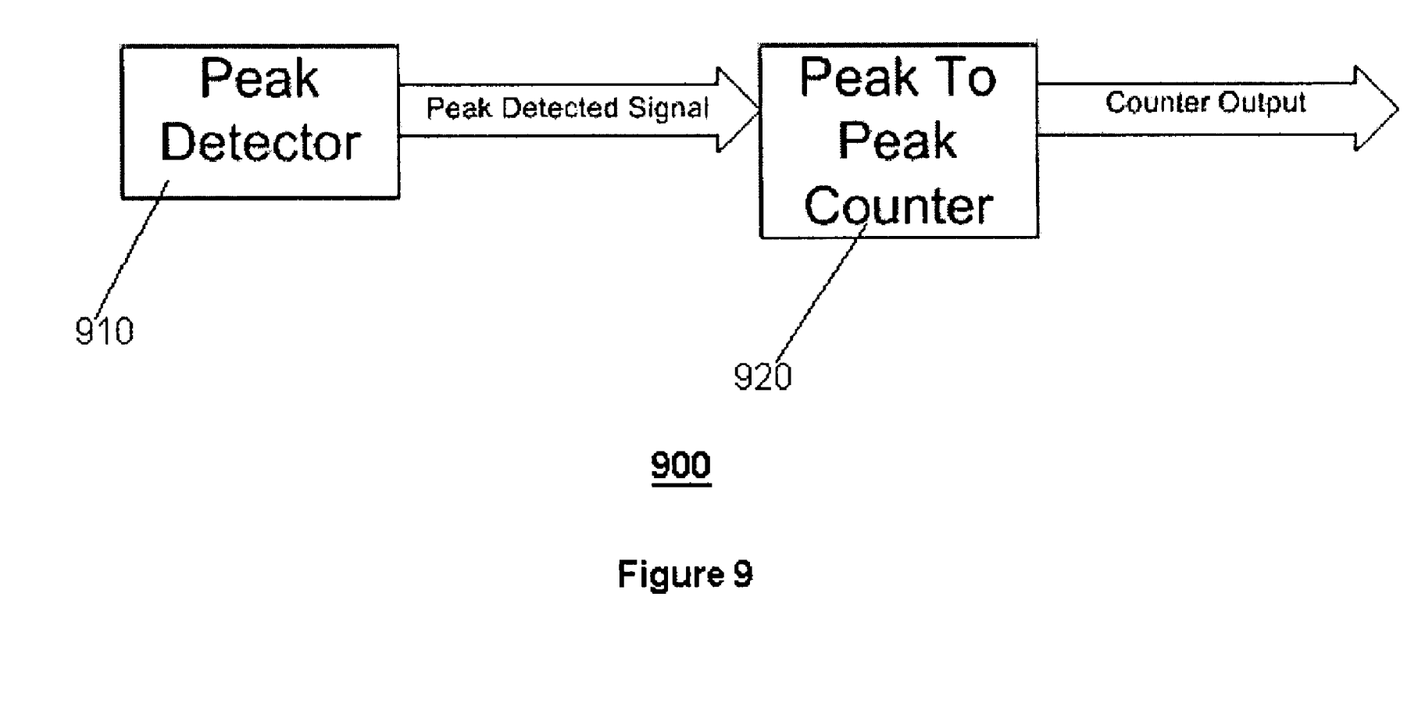

There are many different ways to detect the frequency of an oscillating signal, represented by power supply frequency detector 610. One embodiment, shown in diagram 900 of FIG. 9, illustrates that one way to detect the frequency is to have a peak detector 910 start a counter 920 that will generate a value corresponding to how many counts occur between the peaks of an oscillating signal. Another example will compare a known frequency (generated by a phase-locked loop (PLL) or delay-locked loop (DLL) or oscillators) to that which is sampled from the power supply, and generate a digital or analog signal that represents the difference. The power stabilization control circuitry 620 then generates signals that control the power stabilization circuitry 635 that is synchronized with the oscillations that we are trying to control.

The stabilization control circuitry 620 uses the frequency data and the voltage amplitude data to generate the stabilization control signals. To generate the final control signals, a circuit would take the frequency and amplitude signals and put them together to generate the final control signals. The final control signals not only have the correct phase or frequency information, but also the strength needed from the amplitude information. Consider the following. As a first example we could have the same frequency oscillations in the power supply, but with different amplitudes (in one case a 0.5 Volt peak to peak oscillation, but in another case a 2 Volt peak to peak oscillation—the larger the oscillation magnitude tells us that a larger stabilization load would be needed to counteract or stabilize the original power supply oscillation).

Figure 10:
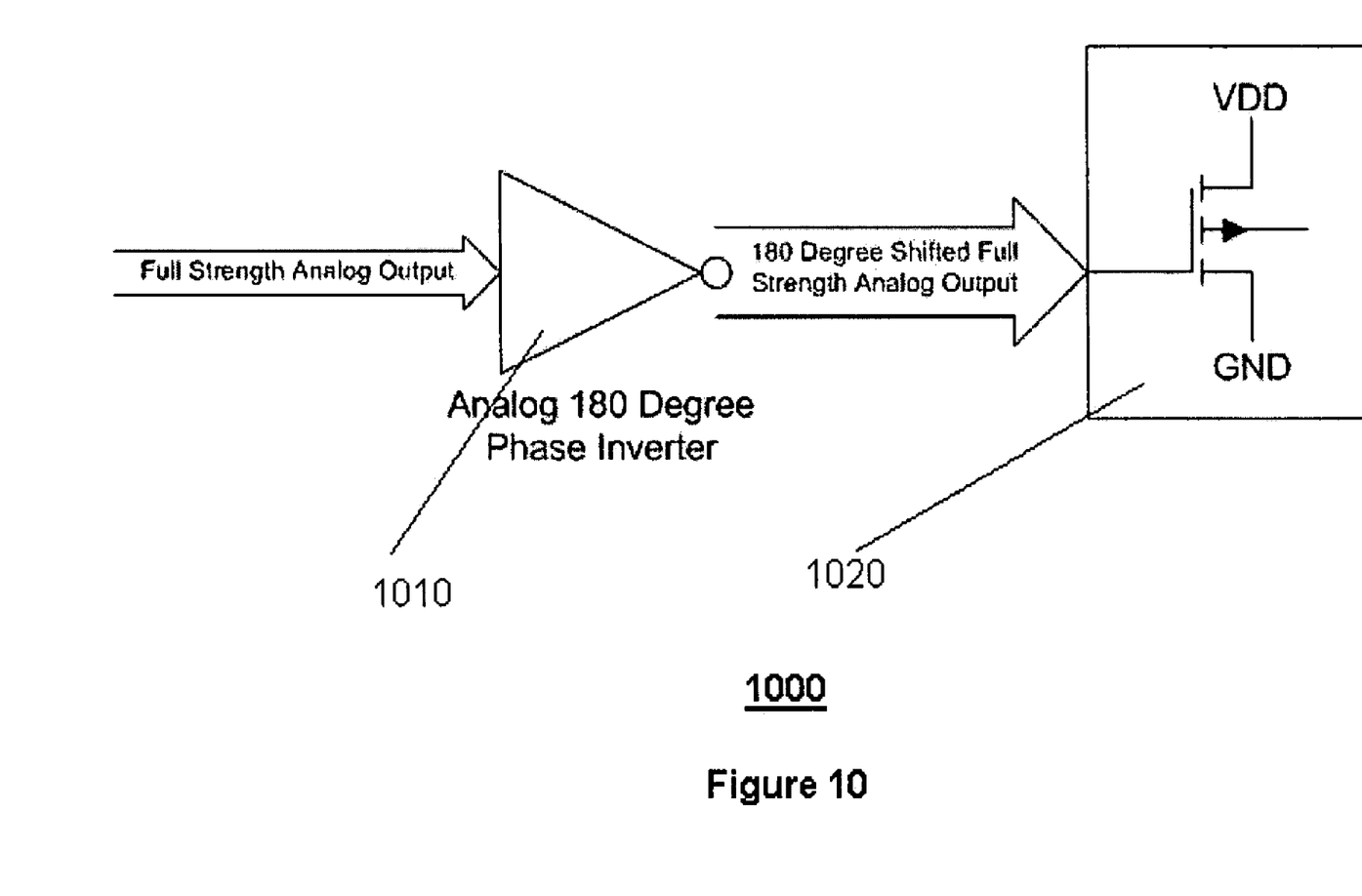

In the case of analog signals, illustrated in the diagram 1000 of FIG. 10, the control signals are operable to drive the stabilization transistors 1020 directly to present a load exactly 180 degrees out of phase of the power supply oscillations, with the desired result of having an equal load at all times thus nullifying the oscillations (two sine waves 180 degrees out of phase added together). Phase inverter 1010 is operable to shift the analog input by 180 degrees.

Figure 11:
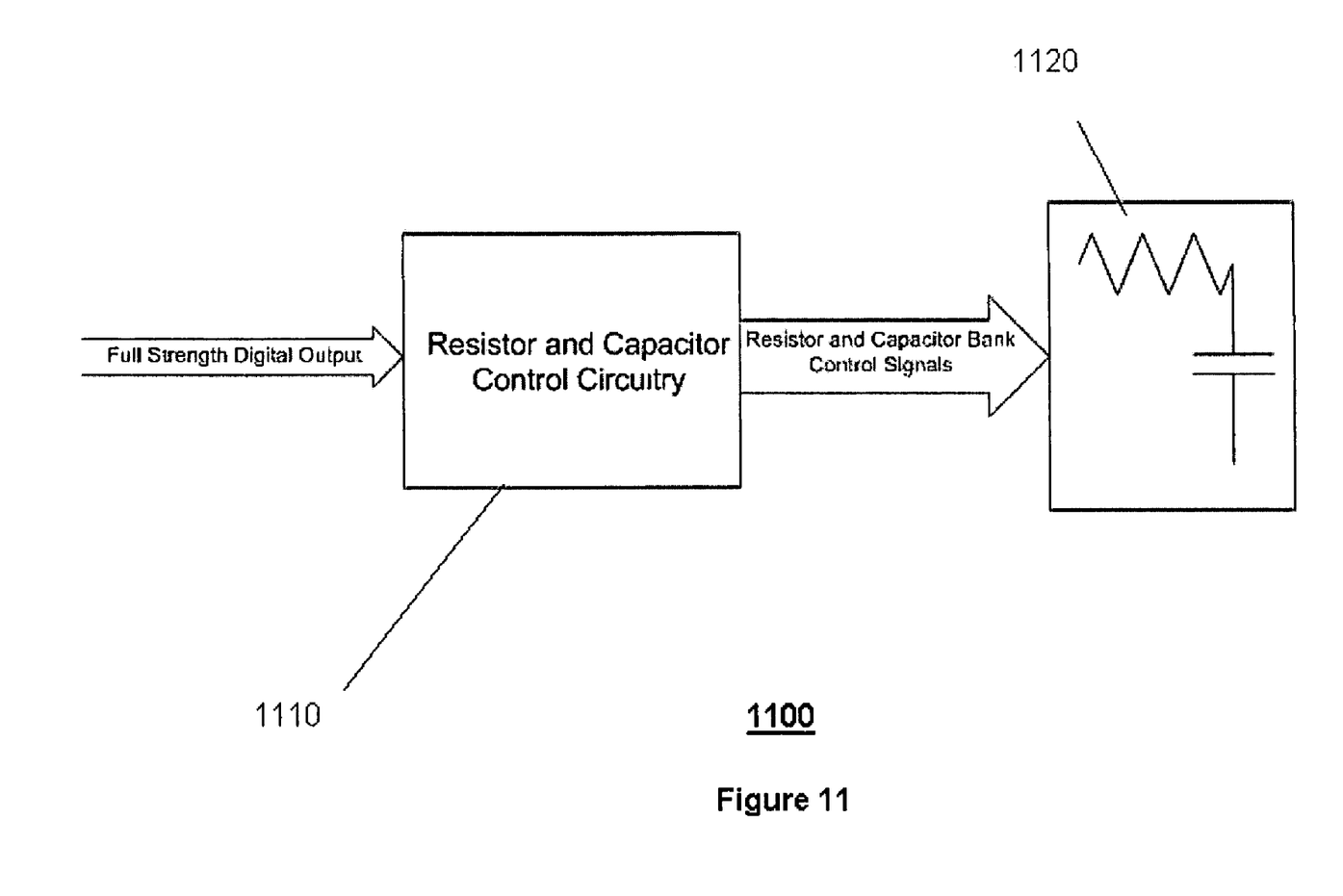

In the digital output case, illustrated in diagram 1100 of FIG. 11, resistor and capacitor control circuitry 1110 can convert the digital control signals back to analog (using for example, a voltage controlled oscillator) and drive the resistor and capacitor network 1120. Or we can use the digital signals directly to control the timing and impedance control of the stabilization circuitry to again present a load that is 180 degrees out of phase with the power supply oscillations.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

The invention claimed is:

1. A structure for enabling active power control of a circuit, comprising:
   a power supply element coupled to the circuit;
   a control element coupled to the circuit, said control element comprising one or more of a phase detector, a counter, a level detector, a voltage controlled oscillator, and one or more transistive elements wherein the control element is operable to measure one or more oscillations of a power supply signal of the power supply element; and
   a stabilization element coupled to the control element and coupled to the circuit, comprising one or more capacitive elements, one or more transistive elements and one or more resistive elements, wherein said one or more capacitive elements, one or more transistive elements and one or more resistive elements are operable to mitigate one or more oscillations of the power supply signal of the power supply element.

2. The structure of claim 1, wherein the oscillations of the power supply signal are high frequency oscillations.

3. The structure of claim 1, wherein the oscillations of the power supply signal contain one or more non-sinusoidal components and one or more sinusoidal components.

4. The structure of claim 1, wherein a phase of the power supply signal is measured using the phase detector.

5. The structure of claim 1, wherein the one or more capacitive elements are ground coupled capacitors.

6. The structure of claim 1, wherein the one or more capacitive elements are one or more of one or more transistors and one or more capacitors.

7. The structure of claim 1, wherein the one or more resistive elements are one or more transistors.

8. The structure of claim 1, wherein one or more of the one or more capacitive elements and the one or more resistive elements are switched on to reduce one or more amplitudes of the one or more oscillations of the power supply signal.

9. The structure of claim 1, wherein the phase detector and the counter are operable to detect one or more resonance frequencies of the power supply signal.

10. The structure of claim 1, wherein one or more of the one or more capacitive elements and the one or more resistive elements are switched on to shift a one or more resonance frequencies of the circuit.

11. The structure of claim 1, wherein one or more of the one or more capacitive elements and the one or more resistive elements are switched on to reduce one or more amplitudes of one or more corresponding resonance frequencies of the circuit.

12. The structure of claim 1, wherein the one or more capacitive elements and the one or more resistive elements inject into the power supply signal a feedback signal that is out of phase with respect to a phase of the power supply signal.

13. The structure of claim 12, wherein switching a one or more of the one or more capacitive elements changes one or more resonance frequencies of the feedback signal.

14. The structure of claim 12, wherein the feedback signal has a feedback amplitude that is substantially the same as a power supply amplitude of the power supply signal.

15. A method for active power control of a circuit, comprising:
    measuring one or more oscillations of a power supply signal; and
    switching one or more of one or more resistive elements, one or more transistive elements and one or more capacitive elements into the circuit, in order to perform one or more of:
      reducing one or more amplitudes of one or more corresponding resonance frequencies of the power supply signal;
      changing one or more operating frequencies of the circuit; and
      injecting a feedback signal into the power supply signal of the circuit;
    wherein the operating frequency of a clock of the circuit is changed after measuring the one or more oscillations of the power supply signal.

16. The method of claim 15, wherein the oscillations of the power supply signal comprise one or more oscillations with a corresponding one or more frequencies, said one or more frequencies exceeding a filtering capability of the circuit.

17. The method of claim 15, wherein the oscillations of the power supply contain one or more non-sinusoidal components and one or more sinusoidal components.

18. The method of claim 15, wherein the one or more capacitive elements are ground coupled capacitors.

19. The method of claim 15, wherein the one or more capacitive elements are one or more of one or more transistors and one or more capacitors.

20. The method of claim 15, wherein the one or more resistive elements are one or more transistors.

21. A method for active power control of a circuit, comprising:
    measuring one or more oscillations of a power supply signal, wherein measuring one or more oscillations of a power supply signal further comprises measuring one or more of:
      one or more phases of the power supply signal;
      one or more amplitudes of the power supply signal;
      one or more frequencies of the power supply signal; and
      one or more spectrums of the power supply signal; and
    switching one or more of one or more resistive elements, one or more transistive elements and one or more capacitive elements into the circuit, in order to perform one or more of:
      reducing one or more amplitudes of one or more corresponding resonance frequencies of the power supply signal;
      changing one or more operating frequencies of the circuit; and
      injecting a feedback signal into the power supply signal of the circuit;
    wherein a phase detector and a counter are used to detect one or more frequencies of the power supply signal.

22. The method of claim 15, wherein a feedback signal is injected into the power supply of the circuit is 180 degrees out of phase with respect to a phase of the power supply signal.

23. The method of claim 22, wherein the feedback signal is injected into the power supply and the feedback signal has a feedback amplitude that is substantially the same as a power supply amplitude of the power supply signal.

24. A structure for enabling active power control of a circuit, comprising:
   a power supply element, coupled to the circuit;
   a control element coupled to the circuit, said control element comprising one or more of a phase detector, a counter, a level detector, a voltage controlled oscillator, and one or more transistive elements wherein the control element is operable to measure one or more oscillations of a power supply signal of the power supply element;
   a stabilization element coupled to the control element and coupled to the circuit, comprising one or more capacitive elements, one or more transistive elements and one or more resistive elements, wherein said one or more capacitive elements, one or more transistive elements and one or more resistive elements are operable to mitigate one or more oscillations of the power supply signal of the power supply element; and
   a means for active power control of the circuit, comprising:
      switching one or more of the one or more resistive elements, one or more transistive elements and the one or more capacitive elements into the circuit, in order to perform one or more of:
         reducing one or more amplitudes of one or more corresponding resonance frequencies of the power supply signal;
         changing one or more operating frequencies of the circuit; and
         injecting a feedback signal into the power supply signal of the circuit.

* * * * *

UNITED STATES PATENT AND TRADEMARK OFFICE
CERTIFICATE OF CORRECTION

PATENT NO. : 7,054,172 B2 Page 1 of 1
APPLICATION NO. : 10/448764
DATED : May 30, 2006
INVENTOR(S) : Jason Harold Culler It is certified that error appears in the above-identified patent and that said Letters Patent is hereby corrected as shown below:

In column 9, line 2, in Claim 22, after "supply" insert -- and a phase of the power supply --.

Signed and Sealed this

Seventeenth Day of March, 2009

JOHN DOLL
*Acting Director of the United States Patent and Trademark Office*